United States Patent
DeCraene

(10) Patent No.: US 9,575,265 B1
(45) Date of Patent: Feb. 21, 2017

(54) UNIVERSAL ADAPTER FOR COUPLING CONDUIT TO ENCLOSURES

(71) Applicant: N A Communications, LLC, St. Charles, IL (US)

(72) Inventor: Paul T. DeCraene, West Chicago, IL (US)

(73) Assignee: N A Communications, LLC, Saint Charles, IL (US)

(*) Notice: Subject to any disclaimer, the term of this patent is extended or adjusted under 35 U.S.C. 154(b) by 165 days.

(21) Appl. No.: 14/485,480

(22) Filed: Sep. 12, 2014

(51) Int. Cl.
*G02B 6/38* (2006.01)

(52) U.S. Cl.
CPC .................................. *G02B 6/3893* (2013.01)

(58) Field of Classification Search
CPC ..... B82Y 20/00; G02B 6/0008; G02B 6/3636; G02B 6/4246; G02B 6/4249; G02B 6/4452; G02B 6/4471; G02B 6/4494
USPC ........................... 385/135–139, 147, 88–100
See application file for complete search history.

(56) References Cited

U.S. PATENT DOCUMENTS

| | | | | |
|---|---|---|---|---|
| 4,069,696 A * | 1/1978 | Steinbach | ............ | E05B 27/083 70/386 |
| 4,251,043 A * | 2/1981 | Horner | .................. | F16M 11/04 248/117.6 |
| 4,615,402 A * | 10/1986 | Eisenloeffel | ......... | E21B 17/046 175/320 |
| 4,838,818 A * | 6/1989 | Edwards | .............. | B63H 20/007 114/144 R |
| 5,217,667 A * | 6/1993 | Griffith | ................... | B28B 19/00 174/68.3 |
| 5,637,827 A * | 6/1997 | Goch | ..................... | G02B 6/442 174/15.3 |
| 5,680,494 A * | 10/1997 | Kaas | .................... | G02B 6/3897 385/147 |
| 5,696,861 A * | 12/1997 | Schimmeyer | ........ | G02B 6/3817 385/75 |
| 5,937,121 A * | 8/1999 | Ott | ....................... | G02B 6/3825 385/59 |
| 6,299,526 B1 * | 10/2001 | Cowan | .................. | H05K 7/207 165/80.3 |
| 7,078,619 B2 * | 7/2006 | Chamberlain | .......... | G01V 1/16 174/37 |
| 7,448,297 B2 * | 11/2008 | Tiong | ...................... | B62J 11/00 24/285 |
| 8,757,892 B1 * | 6/2014 | Allen | .................. | G02B 6/3816 385/59 |
| 9,207,454 B1 * | 12/2015 | Bakhmutsky | ........ | G02B 6/4452 |
| 9,297,976 B2 * | 3/2016 | Hill | ....................... | G02B 6/4447 |
| 2002/0041738 A1 * | 4/2002 | Carberry | ............. | G02B 6/3807 385/56 |

(Continued)

*Primary Examiner* — Akm Enayet Ullah

(57) ABSTRACT

The present subject matter relates to a method, system and device for connecting conduit to an enclosure. The method, system and device comprise a conduit adapter having a two-piece housing and an insert plate. The insert plate is interchangeable with other insert plates having various sized through holes. A conduit is attached to an insert plate via a suitable connector. The insert plate is selected to have an appropriately sized through hole for the conduit being attached. The selected insert plate having the conduit attached then is enclosed between the two halves of the housing of the conduit adapter. The conduit adapter is then secured in the entry port of the enclosure.

12 Claims, 6 Drawing Sheets

(56) References Cited

U.S. PATENT DOCUMENTS

| | | | |
|---|---|---|---|
| 2003/0167919 A1* | 9/2003 | Schempf | F17D 3/01 95/15 |
| 2008/0013893 A1* | 1/2008 | Zheng | G02B 6/3851 385/78 |
| 2008/0317409 A1* | 12/2008 | Neat | F16L 15/006 385/43 |
| 2008/0317411 A1* | 12/2008 | Marquis | G02B 6/3825 385/55 |
| 2009/0108581 A1* | 4/2009 | McCarthy | F16L 5/00 285/405 |
| 2013/0077978 A1* | 3/2013 | Duis | H04B 10/14 398/139 |
| 2014/0178015 A1* | 6/2014 | Tong | G02B 6/4284 385/88 |
| 2014/0318856 A1* | 10/2014 | Carman | H02G 3/0675 174/655 |
| 2015/0378122 A1* | 12/2015 | Simmons | H01R 27/02 439/529 |

* cited by examiner

UNIVERSAL ADAPTER FOR COUPLING CONDUIT TO ENCLOSURES

TECHNICAL FIELD

The exemplary teachings herein pertain to a method, system and device for connecting conduit to a network interface device or similar enclosures. Specifically, the present disclosure relates to a universal adapter used to connect various sized conduit to network interface devices or similar enclosures.

BACKGROUND

To provide service such as communications, alarm, or utility services to a residence, business, or in general any building or structure, network service providers, such as a telephone operating company or long distance carrier, run various cables to and from a network interface device (NID) or similar enclosure. A NID is a weather-proof, box-like enclosure mounted to the building or structure and used to house network interface units (NIUs) or other service equipment. NIUs are equipment that a network service provider places between their lines and the customer's lines. The NIUs can provide a demarcation point for legal tariff issues.

Depending on the type of service being provided, different types of wires or cable may be used, such as coaxial cable, optical fiber cable, twisted pair cables (CAT-3), copper cable (CAT-5), etc. To protect such wires or cables from the weather or other potential damage, it is desirable to run the cables through a conduit. However, typical NIDs or similar enclosures have no adequate means for attaching or securing such conduit. This shortcoming is compounded by the fact that the differing conduit used often varies in size or diameter.

A simple rubber grommet is commonly used to loosely engage the wire or cable entering the NID. Without conduit however, communication or utility services are less reliable and less secure due to the environmental, criminal and/or accidental hazards. Therefore, conduit is becoming more popular as a cabling transport means to NIDs or enclosures. Conduit protects the cables from environmental, accidental, and criminal hazards. Conduit also provides a more efficient or less cumbersome method for cable installation. Most NIDs or enclosures do not have the mechanism to support conduit installation. Some NIDs or enclosures provide brackets or clamps within the enclosure, but these clamps are typically designed for specific conduit or cable.

Thus, when installing conduit into an enclosure, the enclosure often does not have an interface which will provide a secured and sealed connection to the conduit Enclosures typically have a port cavity where the rubber grommet is used as the interface to the connecting cables. If these enclosures encounter conduit, the conduit is often installed below the enclosure and the internal cabling is then installed into the enclosure.

Various known techniques used to hold conduit to or in proximity with a NID or similar enclosure include non-secure, unsealed connections such as by fastening the conduit or cables with tape, brackets, glue, etc., forcing the conduit through the port cavity, applying globs of sealant at the port cavity, clamping the conduit or cables with a clamp assembly, and/or replacing the existing NID with a new, customized enclosure designed to accept a specific conduit. Often, a bracket is installed below the enclosure to support and hold upright the conduit for entry into the enclosure, and the conduit must be stripped back so that the cables within the conduit can then be connected and/or glued into the enclosure. However, such techniques are generally poor, inefficient, temporary, unsightly, and can be costly and/or time consuming to use.

One recent attempt at a solution to suitably connect a cable to a NID is disclosed in U.S. Patent Application Publication No. US 2005/0254757 A1 published to Ferretti, III et al. on Nov. 17, 2005, herein incorporated by reference. Disclosed therein is a connector port for use in a fiber optic communications network and adapted for a NID to receive a connectorized optical fiber from inside the NID and a pre-connectorized fiber optic drop cable from outside the NID.

In one embodiment disclosed therein, an exterior connector port mounted within a base is attached to a drop cable opening located within an external/bottom wall of the NID by way of a slotted end portion of the base. A pre-connectorized drop cable may then be optically connected to a connectorized optical fiber routed to the exterior connector port from inside the NID. Once the optical connection is made, a cover is positioned over the base.

In another embodiment disclosed therein, an insert is positioned within a drop cable opening in an external/bottom wall of the NID, along with a connector receptacle located within the interior cavity of the NID. A portion of the connector receptacle is placed through the insert such that one end of the connector receptacle abuts a passageway of the insert. A connectorized optical fiber is routed to the first end of the connector receptacle from inside the NID, and the end portion of a pre-connectorized fiber optic drop cable is routed from outside the NID to the second end of the connector receptacle to permit an optical fiber of the pre-connectorized drop cable to be readily interconnected with the connectorized optical fiber.

As can be seen, the above described connector port for a NID requires different pieces for different applications, and further requires a specific "connectorized" optical cable for attachment to a specific "pre-connectorized" fiber optic cable. Unlike the device and system disclosed herein, the above described connector port is relatively complex and cannot easily and quickly connect a variety of different conduit to a NID.

As discussed above, such prior art devices and methods suffer from numerous disadvantages, drawbacks and/or limitations. Further, these devices and methods tend to be overly complicated and/or expensive to manufacture or implement. Therefore, a need exists for a method, system and device which are directed toward overcoming the above described and other disadvantages of prior art devices and methods. Accordingly, to address the above stated issues, a method, system and device that can quickly and easily attach different sized conduit to a NID or similar enclosure is needed. The exemplary teachings herein fulfill such a need.

SUMMARY

The exemplary technique(s), system(s) device(s) and method(s) presented herein relate to a universal conduit adapter device, and in particular to a system and method for quickly and easily attaching different sized conduit to a NID or similar enclosure. The exemplary method, system and device disclosed herein include a two piece adapter that is removably secured in the port cavity or entry port of a NID, and an interchangeable insert plate selectively enclosed within the two piece adapter.

The disclosed embodiment of the universal conduit adapter device comprises a two-piece housing and an interchangeable insert plate with a conduit connection through hole. The insert plate is interchangeable such that insert plates having different sized through holes can be used depending on the size of the conduit and how the conduit is secured or connected. When the proper insert plate is selected, the insert plate is secured to the conduit by a suitable connector. In most applications, the conduit is secured to the insert plate by means of a nut or the like. In other applications, the insert plate will support conduit using nylon tie-wrap, spring clamp or the like.

In use, the end of the conduit is inserted into the properly sized through hole of the selected insert plate, and is secured via a suitable connector such as a nut, tie, clamp or the like. The insert plate is then placed on or slid into the bottom half of the adapter housing. The top half of the adapter housing then snaps onto the bottom half, and the insert plate with conduit attached is secured therein. The adapter housing is then inserted into the entry port of the enclosure. In this manner, the cables within the conduit will be protected from environmental, accidental, and criminal hazards. Whether the cables provide communications, alarm, utilities services or the like, the reliability and security of these services will be significantly improved. The universal conduit adapter device, system and method thus provide a low cost and simple technique to install and secure different sized conduit into enclosures. It can thus be readily understood from the present disclosure that the universal conduit adapter device can be used to quickly attach and easily mount conduit of various shapes/sizes to an enclosure.

The universal conduit adapter of the present disclosure provides a simple and cost effective technique to secure, seal, and provide a strain relief on a variety of conduit and connections for an enclosure, in both installation and implementation. Cable management is improved within the enclosure by allowing the bend radius of the cables to occur at the port entry of the enclosure.

Accordingly, it is an objective hereof to provide a method, system and device that provides a universal, sealed connection of a conduit to an enclosure.

It is another objective hereof to provide a method, system and device that improves cable management entering and within the enclosure.

It is still another objective hereof to provide a method, system and device that provides strain relief for a conduit entering an enclosure.

It is a further object hereof to provide a low cost and simple method, system and device to install and secure different sized and types of conduit into enclosures. The method system and device comprises the use of a two piece adapter and an insert. The insert comprises a removable plate which allows the conduit to be secured to the plate. The insert plate is selected according to the different sized and type of conduit being attached to the enclosure.

It is yet another object hereof to allow conduit to be securely installed and sealed to an enclosure, while at the same time decreasing installation time and efforts. The conduit will have strain relief, i.e., the conduit will be supported to minimize stress resulting from conduit movement. The cables within the conduit will be protected from environmental, accidental, and criminal hazards, and the reliability and security of the services being provided to the enclosure will be significantly improved.

Additional objects, advantages and novel features will be set forth in part in the description which follows, and in part will become apparent to those skilled in the art upon examination of the following and the accompanying drawings or may be learned by production or operation of the examples.

BRIEF DESCRIPTION OF THE DRAWINGS

The drawing figures depict one or more implementations in accord with the present teachings, by way of example only, not by way of limitation. In the drawing figures, like reference numerals refer to the same or similar elements.

DETAILED DESCRIPTION

The following description refers to numerous specific details which are set forth by way of examples to provide a thorough understanding of the relevant teachings. It should be apparent to those skilled in the art that the present teachings may be practiced without such details. In other instances, well known methods, procedures, and components have been described at a relatively high-level, without detail, in order to avoid unnecessarily obscuring aspects of the present teachings.

Figure 1:
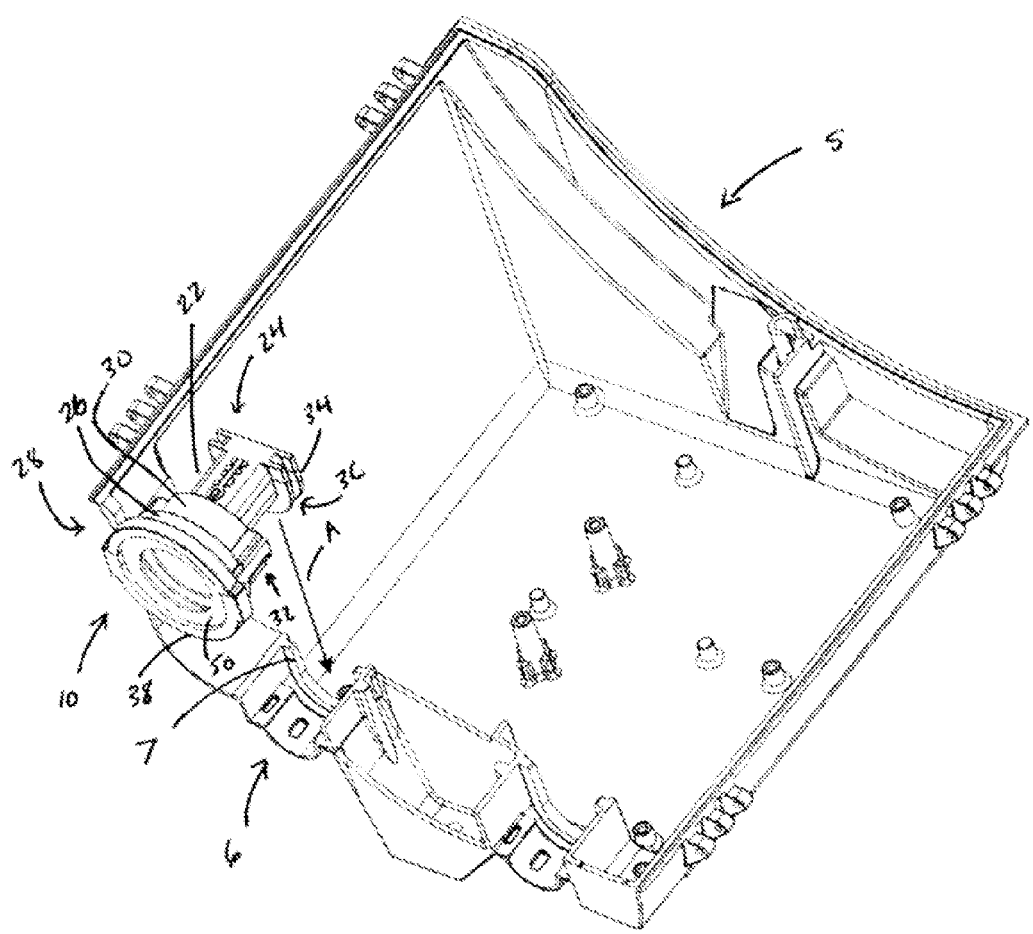
FIG. 1 is a perspective view of a NID or similar enclosure and the universal conduit adapter of the present disclosure.

FIG. 1 illustrates a NID 5 or similar enclosure without its hinged access panel(s) or door(s) which selectively cover or enclose the NID as is known in the art. The NID 5 has at least one entry or access port 6 through which various cables or wires can enter or exit the NID. The access port 6 defines a generally U-shaped opening in the NID, typically at the bottom of the NID as shown. The access port has a generally U-shaped rail or tongue 7, to which a rubber grommet (not shown) is typically attached.

As can be seen in FIG. 1, a universal conduit adapter 10 of the present disclosure is positioned over or in front of the access port 6, and an arrow A is shown to illustrate that the adapter 10 can be slidably and removably inserted into the access port 6 of the NID 5. In this manner, the adapter 10 can easily be selectively placed in and removably secured to the access port 6 of the NID. When the access panels or doors of the NID are closed, the adapter 10 becomes locked or trapped in the access port 6 and cannot be removed from the NID 5 until the access panels or doors are opened.

The adapter 10 is generally tubular, allowing various cables or wires to pass through the adapter 10. The adapter 10 includes a first body portion 22 defining a first end 24 of the adapter 10, a second body portion 26 defining a second end 28 of the adapter 10, and an intermediate body portion 30 having a connector 32. The connector 32 is described in more detail with reference to FIG. 2.

The first body portion 22 has a generally U-shaped flange 34 at first end 24 of the adapter 10. The flange 34 has an external groove 36. The groove 36 is generally U-shaped and removably receives the generally U-shaped rail or tongue 7 in the access port 6 of the NID 5 when the adapter 10 is slid or placed into the access port 6. The engagement of the tongue 7 in the access port 6 with the groove 36 in the flange 34 at the first end 24 of the adapter 10 removably connects the adapter 10 to the NID 5 and securely holds the adapter 10 in place in the access port 6 of the NID 5.

The second body portion 26 has a generally circular flange 38 at second end 28 of the adapter 10. The flange 38 has an internal slot 40 (shown in FIGS. 2 and 3). The slot 40 is generally circular and selectively receives and removably holds a generally annular insert plate 50 as described in more detail below.

Each body portion 22, 26 and 30 is stepped there between, i.e., a step 42 (shown in FIGS. 2 and 3) is formed between first body portion 22 and intermediate body portion 30, and a step 44 (shown in FIGS. 2 and 3) is formed between second body portion 26 and intermediate body portion 30. The steps 42 and 44 add strength to the adapter 10, relieve strain, and thereby minimize stress resulting from conduit movement.

Figure 2:
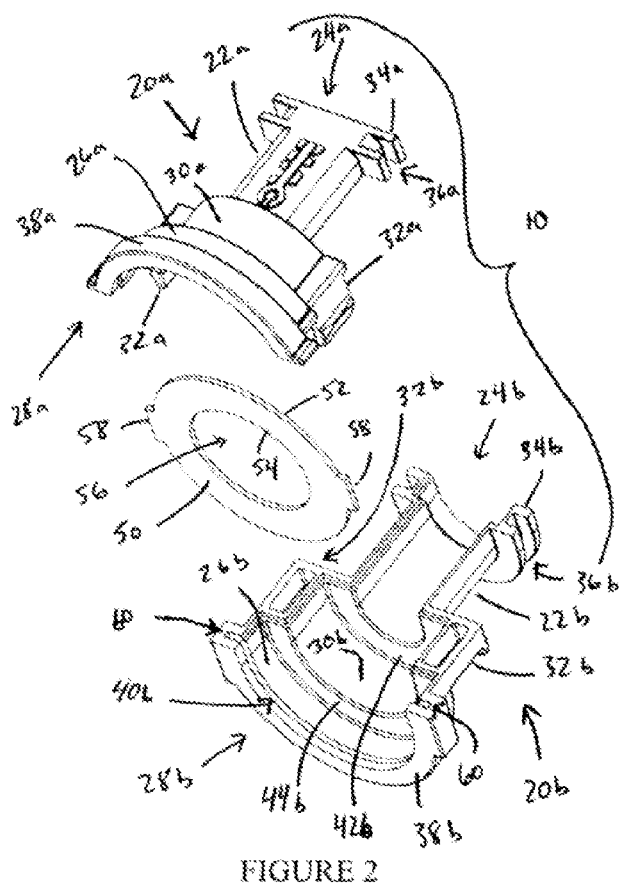
FIG. 2 an exploded perspective view of the universal conduit adapter.

As best seen in FIG. 2, the adapter 10 is preferably comprised of three interconnecting pieces, namely, a first or top half adapter piece 20a, a second or bottom half adapter piece 20b, and the generally annular insert plate 50. The top half adapter piece 20a and the bottom half adapter piece 20b connect together, via connector 32, around the insert plate 50 to form the adapter 10.

Referring now to FIG. 2, an exploded view of the universal conduit adapter 10 is illustrated. The body portions 22, 26 and 30 (shown in FIG. 1) of adapter 10, including flanges 34 and 38 (shown in FIG. 1), are essentially split longitudinally to form the first or top half adapter piece 20a and the second or bottom half adapter piece 20b, which connect via connector 32 around the generally annular insert plate 50. The top half adapter piece 20a and the bottom half adapter piece 20b are each preferably made of a single, molded piece of rigid plastic.

Accordingly, the first or top half adapter piece 20a comprises a first body portion 22a defining a first end 24a, a second body portion 26a defining a second end 28a, and an intermediate body portion 30a there between, defining a connector 32a. The first body portion 22a includes a flange portion 34a at end 24a, defining a groove portion 36a which forms the top portion of the U-shaped groove 36. The second body portion 26a includes a flange portion 38a at end 28a, defining a generally semicircular slot portion 40a (shown in FIG. 3) which forms the top portion of the slot 40. The intermediate body portion 30a includes at least one connector 32a for connecting the top half adapter piece 20a to the bottom half adapter piece 20b. A step 42a (shown in FIG. 3) is formed between first body portion 22a and intermediate body portion 30a, and a step 44a (shown in FIG. 3) is formed between second body portion 26a and intermediate body portion 30a.

The second or bottom half adapter piece 20b comprises a first body portion 22b defining a first end 24b, a second body portion 26b defining a second end 28b, and an intermediate body portion 30b there between, defining a connector 32b. The first body portion 22b includes a flange portion 34b at end 24b, defining a groove portion 36b which forms the bottom portion of the U-shaped groove 36. The second body portion 26b includes a flange portion 38b at end 28b, defining a generally semicircular slot portion 40b which forms the bottom portion of the slot 40. The intermediate body portion 30b includes at least one connector 32b for connecting the bottom half adapter piece 20b to the top half adapter piece 20a. A step 42b is formed between first body portion 22b and intermediate body portion 30b, and a step 44b is formed between second body portion 26b and intermediate body portion 30b.

As illustrated, connector 32a comprises two clips, and connector 32b comprises two complimentary clip receptacles for receiving the respective one of the two clips. The clips are resilient and each clip has a locking element at the end thereof. When each clip is inserted into the respective clip receptacle, each clip deforms inward until their locking element slides past the end of the respective clip receptacle, at which time each clip snaps back to its original position such that each locking element is positioned under the edge of the respective clip receptacle, thereby securely locking the top half adapter piece 20a to the bottom half adapter piece 20b. The clips will stay securely locked in their respective clip receptacles until an external force is applied to their locking elements so that each clip deforms inward and no longer engages the bottom edge of each clip receptacle, at which time the clips can slide out of their respective clip receptacles to detach the top half adapter piece 20a from the bottom half adapter piece 20b.

Also illustrated in FIG. 2 is insert plate 50, preferably comprising an annular ring of metal. Insert plate 50 thus defines an outer perimeter of circumference 52 and an inner perimeter or circumference 54. The inner perimeter or circumference 54 defines a through hole 56 in the insert plate 50. The through hole 56 has a diameter. The outer perimeter or circumference 52 is selectively received in the slot 40 of flange 38 of the second body portion 36. Preferably, two tabs 58 are formed along the outer perimeter 54 of insert plate 50. Similarly, two complimentary tab slots 60 are formed in the flange 38, preferably in flange portion 38b of the bottom half adapter piece 20b, to receive the respective tabs 58. These tabs 58 when received in tab slots 60 prevent the insert plate 50 from rotating inside slot 40 when the top half adapter piece 20a is connected to the bottom half adapter piece 20b around the insert plate 50. This provides a more stable and secure connection of the conduit to the NID, reduces stress and strain, and thereby improves the reliability and security of the services associated with the NID.

Figure 3:
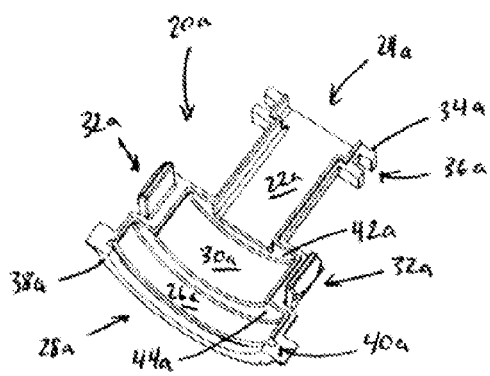
FIG. 3 is an opposite perspective view of the top half of the housing of the universal conduit adapter of FIG. 2.

Referring now to FIG. 3, the inside of the first or top half adapter piece 20a is illustrated. As described with respect to FIG. 2, the top half adapter piece 20a comprises a first body portion 22a defining a first end 24a, a second body portion 26a defining a second end 28a, and an intermediate body portion 30a there between, defining a connector 32a comprising two clips. The first body portion 22a includes a flange portion 34a at end 24a, defining a groove portion 36a which forms the top portion of the U-shaped groove 36. The second body portion 26a includes a flange portion 38a at end 28a, defining a generally semicircular slot portion 40a which forms the top portion of the slot 40. As can be seen, the first body portion 22a is generally rectangular in shape, while the second body portion 26a and the intermediate body portion 30a are generally semi-circular in shape. A step 42a is formed between first body portion 22a and intermediate body portion 30a, and a step 44a is formed between second body portion 26a and intermediate body portion 30a.

Figure 4:
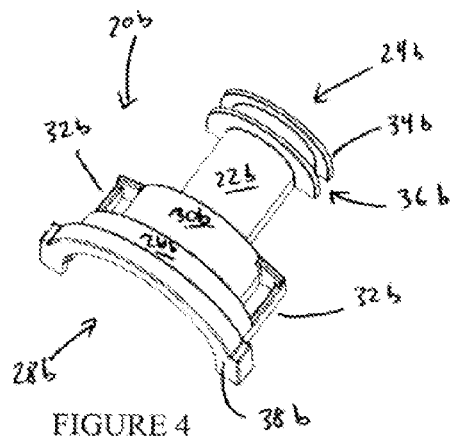
FIG. 4 is an opposite perspective view of the bottom half of the housing of the universal conduit adapter of FIG. 2.

Referring now to FIG. 4, the outside of second or bottom half adapter piece 20b is illustrated. As described with respect to FIG. 2, the bottom half adapter piece 20b comprises a first body portion 22b defining a first end 24b, a second body portion 26b defining a second end 28b, and an intermediate body portion 30*b* there between, defining a connector 32*b* comprising two clip receptacles. The first body portion 22*b* includes a flange portion 34*b* at end 24*b*, defining a groove portion 36*b* which forms the bottom portion of the U-shaped groove 36. The second body portion 26*b* includes a flange portion 38*b* at end 28*b*, defining a generally semicircular slot portion 40*b* (shown in FIG. 2) which forms the bottom portion of the slot 40. Flange portion 38*b* included tab slots 60 (shown in FIG. 2). As can be seen, the first body portion 22*b*, second body portion 26*b* and the intermediate body portion 30*b* are generally semicircular in shape. A step 42*b* (shown in FIG. 2) is formed between first body portion 22*b* and intermediate body portion 30*b*, and a step 44*b* (shown in FIG. 2) is formed between second body portion 26*b* and intermediate body portion 30*b*.

Figure 5:
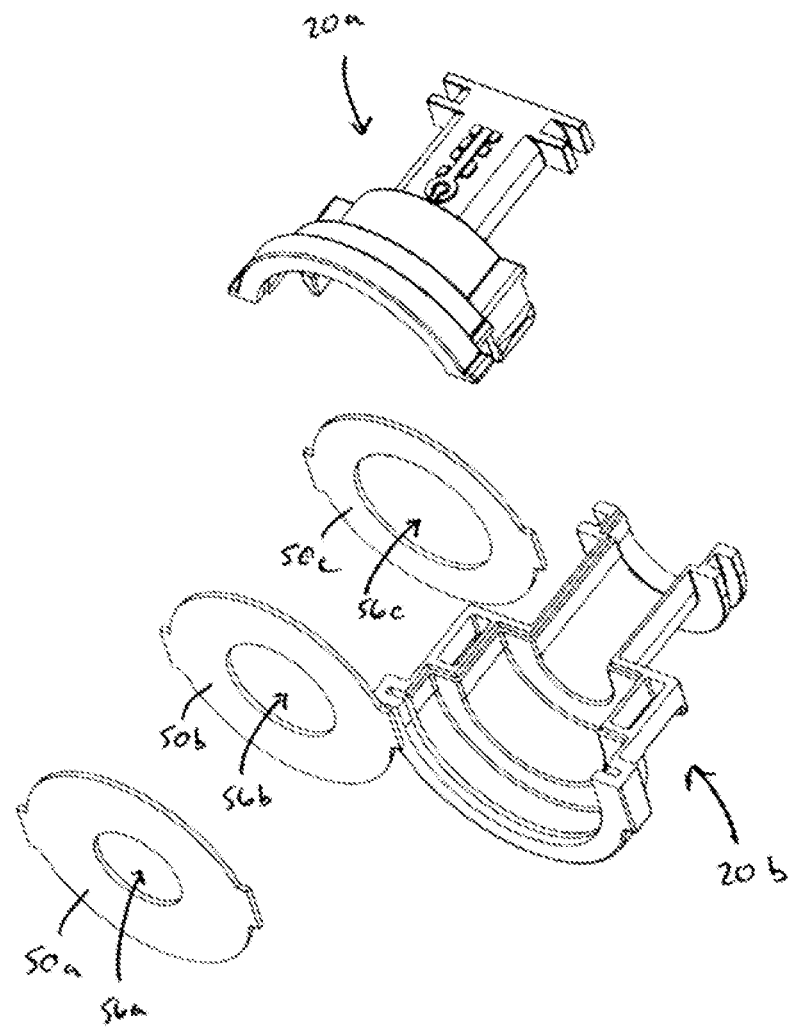
FIG. 5 is an exploded perspective view of the universal conduit adapter illustrating a number of insert plates with various sized through holes.

FIG. 5 illustrates the interchangeability of the insert plate 50 within the top half adapter piece 20*a* and the bottom half adapter piece 20*b*. Three insert plates 50*a*, 50*b* and 50*c* are shown with through holes 56*a*, 56*l*, and 56*c* respectively. Through holes 56*a*, 56*b*, and 56*c* each have different diameters respectively. By way of example only, and without limitation, through hole 56*a* may have a ½ inch diameter, through hole 56*b* may have a ¾ inch diameter, and through hole 56*c* may have a 1 inch diameter. However, it should be understood that insert plate 50 could have a through hole 56 of any suitable diameter corresponding to the diameter size of the conduit being attached. Thus, for example, if a conduit having a ¾ inch diameter is being connected to the NID 5, then insert plate 50*b* would be selected and used to connect the conduit to the NID 5, as described with respect to FIG. 6.

Figure 6:
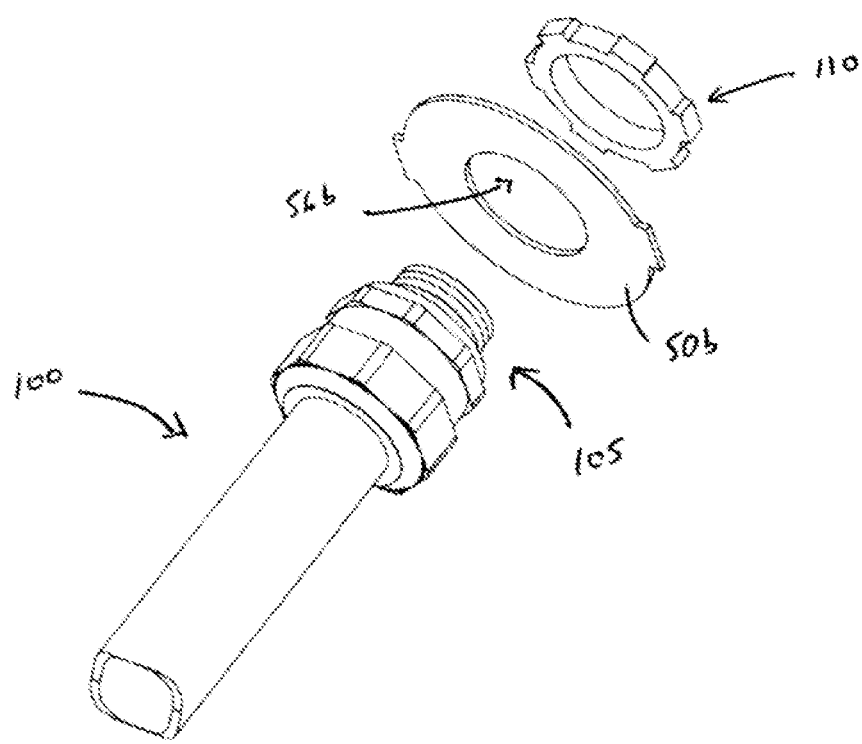
FIG. 6 is an exploded perspective view of a conduit, insert plate and connector.

In FIG. 6, a conduit 100 is illustrated. Conduit 100 has an end connector 105. If for example conduit 100 and more specifically end connector 105 has a ¾ inch diameter, then insert plate 50*b* having a through hole 56*b* with a ¾ inch diameter is selected. It should be understood that the diameter of the through hole 56*b* will be slightly larger than the diameter of the conduit end connector 105 to allow the conduit end connector 105 to pass through the through hole 56*b* in insert plate 50*b*. After conduit end connector 105 is placed through the through hole 56*b*, a nut 110 or other suitable connector is place onto end connector 105, thereby securing the insert plate 50*b* to the end connector 105 of the conduit 100.

Once the properly sized insert plate 50 is selected and secured to the end connector 105, the insert plate 50 is placed in the slot 40*b* of the flange 38*b* of the bottom half adapter piece 20*b*, with the tabs 58 situated in the tab slots 60. The top half adapter piece 20*a* is then snapped onto the bottom half adapter piece 20*b* via connector 32. Once the universal conduit adapter 10 has been placed onto conduit 100, the adapter 10 is simply placed or slid into the access port 6 of the NID 5 to secure the conduit to the NID. In this manner, the conduit 100 can quickly and easily connected to the NID by hand, without the need for any tools. The entire process of connecting the insert plate 50 to the conduit end connector 105 via nut 110, connecting the top half adapter piece 20*a* to the bottom half adapter piece 20*b* around the insert plate 50, and inserting the adapter 10 into the access port 6 of the NID 5 can be completed in less than a minute.

Figure 7:
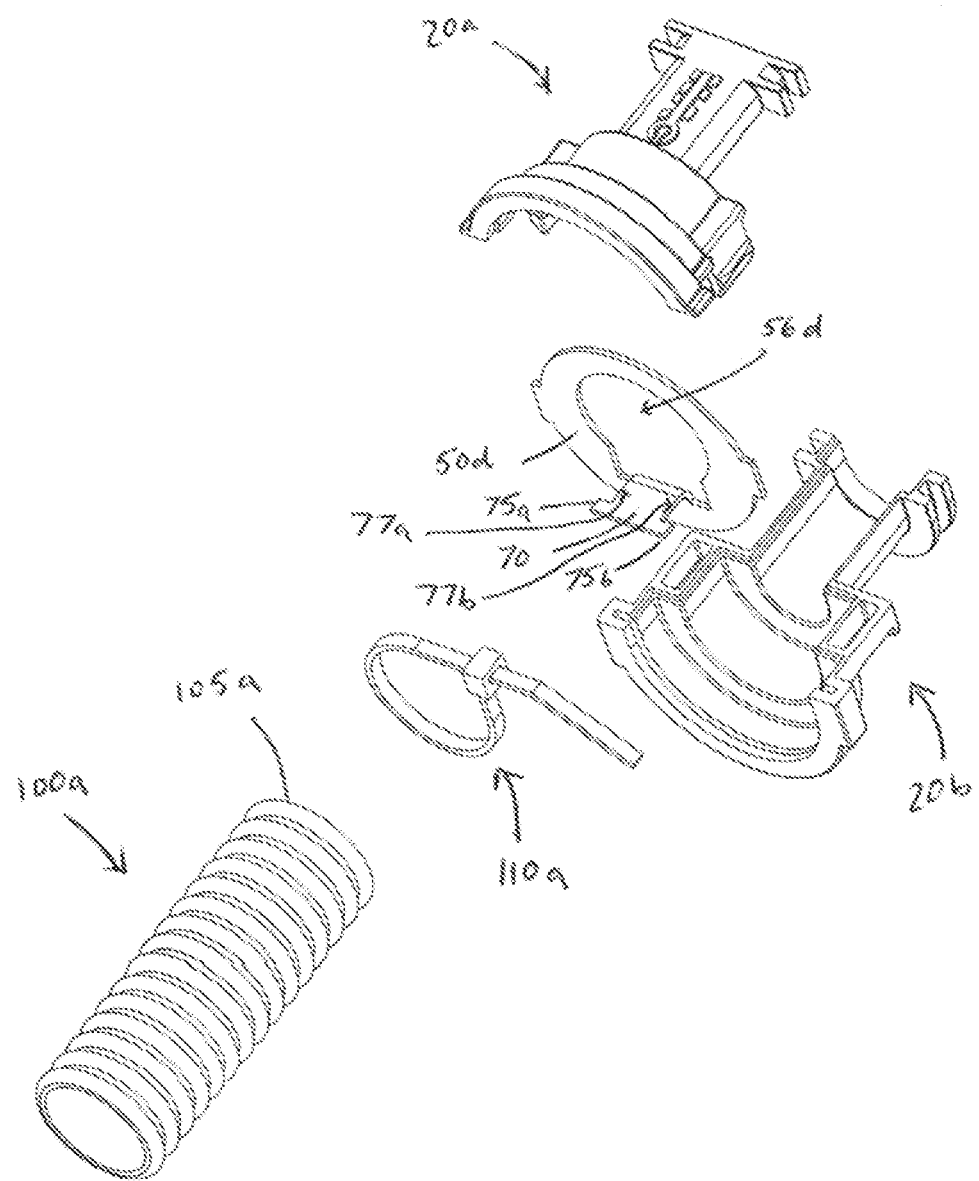
FIG. 7 is an exploded perspective view of the universal conduit adapter illustrating an alternate embodiment of an insert plate, conduit and connector.

FIG. 7 illustrates the universal conduit adapter comprising top half adapter piece 20*a* and the bottom half adapter piece 20*b*, and utilizing an alternate insert plate 50*d* and an alternate connector 110*a*, for connecting an alternate conduit 100*a* having an end 105*a* which has no connector affixed thereto. Insert plate 50*d* has a through hole 56*d* which can be sized to any desired diameter, and thus the insert plate 50*d* can be interchangeable and selected according to the size of the through hole 56*d* in the manner discussed above with respect to FIG. 5. Insert plate 50*d* also has a flange 70 extending generally perpendicular therefrom. Flange 70 serves to engage and connect the alternate conduit 100*a* using a tie 110*a*. Tie 110*a* is illustrated as a zip tie, although any suitable tie, belt, noose, pipe clamp or the like could be used to secure the conduit 100*a* to the flange 70. Flange 70 preferably includes a pair of tabs 75*a* and 75*b* extending from flange 70 as illustrated, thereby forming a pair of recesses 77*a* and 77*b* respectively along the sides of the flange 70. When the conduit 100*a* is connected to the flange 70 via tie 110*a*, as shown in FIG. 8, the tie 110*a* rests in the recesses 77*a* and 77*b* such that tabs 75*a* and 75*b* prevent the tie 110*a*, and thus conduit 100*a*, from sliding off of the flange 70.

Figure 8:
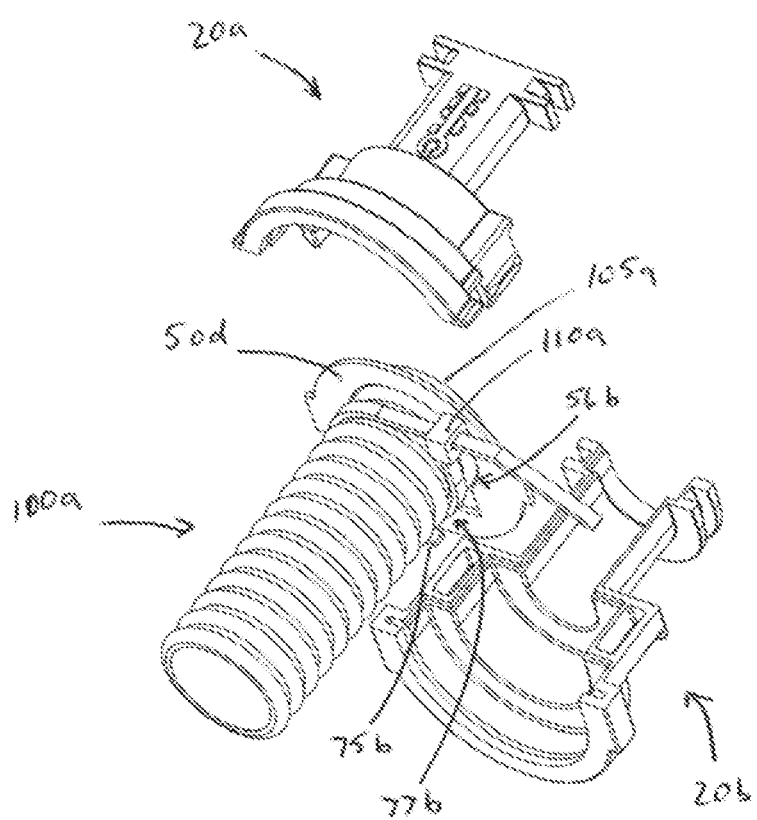
FIG. 8 is an exploded perspective view of the alternate embodiment of FIG. 7 illustrating the alternate conduit connected to the alternate insert plate.

Referring now to FIG. 8, conduit 100*a* is shown attached to insert plate 50*d* as follows. The end 105*a* of conduit 100*a* is preferably placed a short distance through the through hole 56*d* of insert plate 50*d*. In this instance, the diameter of the through hole 56*d* of the selected insert plate 50*d* will be slightly larger than the diameter of the conduit end 105*a* to allow the conduit 100*a* to pass through the through hole 56*d* in insert plate 50*d*. After conduit end 105*a* is placed through the through hole 56*d*, a tie 110*a* or other suitable connector is place around both the conduit 100*a* and the flange 70 and tightened to securing the insert plate 50*d* to the conduit 100*a*. When tightened, tie 110*a* rests in the recesses 77*a* and 77*b* along the sides of flange 70, and is prevented from sliding off the flange 70 by tabs 75*a* and 75*b*.

It should be understood that the flange 70 could take any suitable size, shape or form so long as the conduit can be secured to the flange using any suitable connector. It is foreseen that a second flange could be formed on plate 50*d* opposite the first flange for a more secure connection. It should also be understood that the conduit 100*a* need not pass through the through hole 56*b*, especially where two flanges are provided, so long as flange 70 is of a sufficient length to adequately engage and secure the conduit 100*a* thereto via tie 110*a*. Still further, if two flanges are provided, the flanges could be positioned inside of the conduit 100*a*, with tie 110*a* positioned around conduit 100*a* near end 105*a* and tightened to partially deform the conduit into the recesses of the flanges. Alternatively, an annular flange, preferably but not necessarily with a lip, can be formed around the perimeter of the through hole 56*d*, and the annular flange positioned inside conduit 100*a* and secured with tie 110*a* positioned around conduit 100*a* near end 105*a*. If a lip is provided, the conduit 100*a* will partially deform around the lip of the annular flange to prevent conduit 100*a* from sliding off the annular flange. Otherwise, the conduit 110*a* could be simply held to the annular flange via the pressure from the tie 110*a* when tightened enough to create suitable pressure to prevent conduit 100*a* from sliding off the annular flange.

While the above discussed embodiment(s) have been described with reference to a NID, it should be understood that the universal conduit adapter 10 can also be mounted on other suitable enclosures to which cables or wires from a conduit are fed. In general, the first body portion 22 and the flange 34 can be shaped to correspond to the shape of the access port of any enclosure. Additionally, the components of the universal conduit adapter 10 can be made from any suitable material, such as metal, plastic, or any suitable material capable of adequately performing their respective intended functions.

Further, while the preferred and alternate embodiment(s) are illustrative of the structure, function and operation of the exemplary method, system and device, it should be understood that various modifications may be made thereto without departing from the teachings herein. For example, the first body portion 22a could be integral with first body portion 22b, or the adapter 10 could be one single integral piece, except for second body portion 26a. Any suitable connector 32 could be provided in any location to connect the non-integral body portion(s) with the integral body portion. A suitable pin, clamp, tie, set screw, clip or other fastener, connector, attachment or tightening device could replace the nut 110. Further, the insert plate 50 could be integral with the second body portion 26 and split in accordance with the second body portions 26a and 26b. The nut 110 could be provided with a grooved perimeter into which the split insert plate could be inserted. Alternatively, the universal conduit adapter could simply comprise the first body portion having internal threads corresponding to the size of the conduit end connector, and could simply be screwed onto the conduit end connector and then placed directly into the access port of the enclosure. Various other modifications could be made so long as the conduit end can be quickly and easily secured to the universal adapter.

While the foregoing discussion presents the teachings in an exemplary fashion with respect to the disclosed method, system and device for a universal conduit adapter 10, it will be apparent to those skilled in the art that the teachings may apply to any type of conduit connecting to any type of enclosure. Further, while the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein.

What is claimed is:

1. A device for connecting a conduit to an access port of an enclosure, comprising:
   an adapter having a first end and a second end, wherein the adapter defines a longitudinal passageway therethrough;
   an access port connector at the first end of the adapter; and
   a conduit connector at the second end of the adapter;
   wherein the adapter is split longitudinally into a first adapter piece and a second adapter piece, and wherein the first adapter piece and the second adapter piece removably connect together.

2. The device of claim 1, wherein the conduit connector comprises a generally circular flange having an internal slot adapted to receive a generally annular insert plate, wherein the generally annular insert plate has a hole defining a diameter, and wherein the diameter of the hole is selectively sized according to the size of the conduit.

3. The device of claim 2, wherein the conduit connector of the adapter permits interchangeability of annular insert plates with varying diameters.

4. The device of claim 3, wherein the annular insert plate is secured to the conduit by a fastener.

5. The device of claim 4, wherein the annular insert plate has a flange for engaging the conduit via the fastener.

6. The device of claim 3, wherein the first adapter piece and the second adapter piece have complimentary connector pieces allowing the first adapter piece and the second adapter piece to removably connect together around the annular insert plate.

7. The device of claim 1, wherein the access port connector includes a flange having an external groove adapted to receive a tongue of the access port.

8. A system for connecting conduit to an access port of an enclosure, comprising:
   a universal conduit adapter for connecting at a first end to an access port of an enclosure, and for connecting at a second end to conduit defining a diameter, wherein the universal conduit adapter defines a longitudinal passageway therethrough, and wherein the universal conduit adapter is split longitudinally into a first housing piece and a second housing piece; and
   an insert plate, wherein the insert plate comprises an annular ring having a through hole defining a diameter for receiving and attaching to the conduit; and
   wherein the first housing piece connects to the second housing piece around the insert plate.

9. The system of claim 8, further comprising a plurality of insert plates, each having a through hole with a different diameter; wherein the insert plates are interchangeable in the universal conduit adapter.

10. The system of claim 9, wherein one of the plurality of insert plates is selected according to the diameter of the conduit and is attached thereto by a fastener, and wherein the insert plate is removably secured between the first housing piece and the second housing piece.

11. The system of claim 8, wherein the insert plate has a flange for engaging the conduit via a fastener.

12. A method for connecting a conduit to an enclosure, comprising the steps of:
   selecting an insert plate comprising an annular ring having a though hole;
   securing the insert plate to the conduit;
   placing the insert plate secured to the conduit into a bottom adapter piece at a first end thereof;
   attaching a top adapter piece to the bottom adapter piece to define a longitudinal passageway, and to secure the insert plate between the top adapter piece and the bottom adapter piece; and
   connecting the attached top and bottom adapter pieces at a second end thereof to an entry port of the enclosure.

* * * * *